(12) United States Patent
Sorkin

(10) Patent No.: US 7,866,009 B1
(45) Date of Patent: Jan. 11, 2011

(54) WEDGES FOR SHEATHING LOCK SYSTEM

(76) Inventor: Felix L. Sorkin, 13022 Trinity Dr., Stafford, TX (US) 77477

( * ) Notice: Subject to any disclaimer, the term of this patent is extended or adjusted under 35 U.S.C. 154(b) by 109 days.

(21) Appl. No.: 12/051,077

(22) Filed: Mar. 19, 2008

(51) Int. Cl.
*F16G 11/04* (2006.01)

(52) U.S. Cl. .................................................. 24/136 R

(58) Field of Classification Search .... 24/136 R–136 L, 24/122.3, 122.6, 115 M; 403/211, 374.1, 403/409.1; 52/223.13, 223.8, 223.14
See application file for complete search history.

(56) References Cited

U.S. PATENT DOCUMENTS

| | | | | |
|---|---|---|---|---|
| 2,416,501 A | * | 2/1947 | Sundbergh | 175/19 |
| 3,758,922 A | * | 9/1973 | Field | 24/136 R |
| 4,209,661 A | * | 6/1980 | Pate et al. | 174/659 |
| 4,455,717 A | * | 6/1984 | Gray | 24/115 R |
| 5,233,730 A | * | 8/1993 | Milne et al. | 24/136 R |

* cited by examiner

*Primary Examiner*—James R Brittain
(74) *Attorney, Agent, or Firm*—Egbert Law Offices PLLC

(57) ABSTRACT

A wedge for retaining a tendon in an anchor has first, second, third, and fourth portions. The portions each have a channel. The first portion has a constant thickness from a first end to a second end. The second portion has a first end adjacent to the second end of the first portion and tapers from the first end of the second portion to a second end thereof. The third portion has a first end adjacent to the second end of the second portion and tapers from the first end of the third portion to a second end thereof. The fourth portion has a first end adjacent to the second end of the third portion and tapers from the first end of the fourth portion to a second end thereof. The channels of each of the portions have ribs.

16 Claims, 4 Drawing Sheets

WEDGES FOR SHEATHING LOCK SYSTEM

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to post-tension anchor systems. More particularly, the present invention relates to dead-end anchors used in such post-tension systems. More particularly still, the present invention relates to devices used for retaining a tendon within the dead-end anchor of a post-tension system. Additionally, the present invention relates to devices for preventing the shrinkage of a sheathing that extends over the tendon.

2. Description of Related Art Including Information Disclosed Under 37 CFR 1.97 and 37 CFR 1.98

For many years, the design of concrete structures imitated the typical steel design of column, girder and beam. With technological advances in structural concrete, however, concrete design began to evolve. Concrete has the advantages of costing less than steel, of not requiring fireproofing, and of having plasticity, a quality that lends itself to free flowing or boldly massive architectural concepts. On the other hand, structural concrete, though quite capable of carrying almost any compressive load, is weak in carrying significant tensile loads. It becomes necessary, therefore, to add steel bars, called reinforcements, to concrete, thus allowing the concrete to carry the compressive forces and the steel to carry the tensile forces.

Structures of reinforced concrete may be constructed with load-bearing walls, but this method does not use the full potentialities of the concrete. The skeleton frame, in which the floors and roofs rest directly on exterior and interior reinforced-concrete columns, has proven to be most economical and popular. Reinforced-concrete framing is seemingly a simple form of construction. First, wood or steel forms are constructed in the sizes, positions, and shapes called for by engineering and design requirements. The steel reinforcing is then placed and held in position by wires at its intersections. Devices known as chairs and spacers are used to keep the reinforcing bars apart and raised off the form work. The size and number of the steel bars depends completely upon the imposed loads and the need to transfer these loads evenly throughout the building and down to the foundation. After the reinforcing is set in place, the concrete, comprising a mixture of water, cement, sand, and stone or aggregate and having proportions calculated to produce the required strength, is set, care being taken to prevent voids or honeycombs.

One of the simplest designs in concrete frames is the beam-and-slab. This system follows ordinary steel design that uses concrete beams that are cast integrally with the floor slabs. The beam-and-slab system is often used in apartment buildings and other structures where the beams are not visually objectionable and can be hidden. The reinforcement is simple and the forms for casting can be utilized over and over for the same shape. The system, therefore, produces an economically viable structure. With the development of flat-slab construction, exposed beams can be eliminated. In this system, reinforcing bars are projected at right angles and in two directions from every column supporting flat slabs spanning twelve or fifteen feet in both directions.

Reinforced concrete reaches its highest potentialities when it is used in pre-stressed or post-tensioned members. Spans as great as five hundred feet can be attained in members as deep as three feet for roof loads. The basic principle is simple. In pre-stressing, reinforcing tendons of high tensile strength wires are stretched to a certain determined limit and then high-strength concrete is placed around them. When the concrete has set, it holds the steel in a tight grip, preventing slippage or sagging. Post-tensioning follows the same principle, but the reinforcing tendon, usually a steel cable, is held loosely in place while the concrete is placed around it. The reinforcing tendon is then stretched by hydraulic jacks and securely anchored into place. Pre-stressing is done with individual members in the shop and post-tensioning as part of the structure on the site.

In a typical tendon tensioning anchor assembly used in such post-tensioning operations, there are provided anchors for anchoring the ends of the cables suspended therebetween. In the course of tensioning the cable in a concrete structure, a hydraulic jack or the like is releasably attached to one of the exposed ends of each cable for applying a predetermined amount of tension to the tendon, which extends through the anchor. When the desired amount of tension is applied to the cable, wedges, threaded nuts, or the like, are used to capture the cable at the anchor plate and, as the jack is removed from the tendon, to prevent its relaxation and hold it in its stressed condition.

In typical post-tension systems, the tendon is received between a pair of anchors. One of the anchors is known as the "live-end" anchor, and the opposite end is known as the "dead-end" anchor. The "live-end" anchor receives the end of the tendon which is to be tensioned. The "dead-end" anchor holds the tendon in place during the tensioning operation. Under typical operations, a plurality of wedges are inserted into an interior passageway of the anchor and around the exterior surface of the tendon. The tendon is then tensioned so as to draw the wedges inwardly into the interior passageway so as establish compressive and locking contact with an exterior surface of the tendon. This dead-end anchor can then be shipped, along with the tendon, for use at the job site.

One technique for forming such dead-end anchors is to insert the end of a tendon into the cavity of the anchor, inserting wedges into the space between the tendon and the wall of the cavity and then applying a tension force onto another end of the tendon so as to draw the wedges and the end of the tendon into the cavity in interference-fit relationship therewith. This procedure is somewhat difficult since the tendon can have a considerable length and since the use of tension forces can create a somewhat unreliable connection between the wedges and the tendon. Experimentation has found that the application of compressive force onto the end of the tendon creates a better interference-fit relationship between the wedges, the end of the tendon and the wall of the cavity of the anchor.

Another technique is described in U.S. Pat. No. 6,513,287, issued on Feb. 4, 2003 to the present inventor. This patent describes a method and apparatus for forming an anchorage of a post-tension system in which a tendon is positioned within a cavity of the anchor such that an end of the tendon extends outwardly of the cavity. A plurality of wedges are mechanically inserted within the cavity between the tendon and a wall of the cavity. Pressure is applied to an end of the tendon such that the tendon and the wedges are in interference-fit relationship within the cavity. A compression mechanism is used having a cylindrical member and a plunger extending in a channel of the cylindrical member. The wedges are attached to the cylindrical member and the cylindrical member is moved toward the cavity such that the wedges enter a space between the tendon and the wall of the cavity. The plunger applies a compressive force to the end of the tendon when the end of the tendon is in the channel of the cylindrical member.

One of the problems with conventional dead-end anchorages is that the sheathing over the tendon has a tendency to shrink over time. The shrinkage is the result of various factors. One major factor is that the sheathing is formed over the tendon in an extrusion process. As such, the polymeric material used for the sheathing is relatively hot as it exits the extrusion process. Immediately after leaving the extrusion process, the tendon, along with the sheathing, is tightly wound around a spool. During shipment, the tight winding of the tendon around the spool will mechanically resist any shrinking of the sheathing over the lubricated exterior of the steel cable on the interior of the tendon. When the cable is unwound from the spool, these mechanical forces are released. As such, as the tendon is installed in an anchor, the relaxation of these mechanical forces will generally and slowly cause the sheathing to shrink over the length of the tendon. After the tendon is connected to a dead end anchorage, the end of the sheathing will tend to the shrink slowly away from the dead end anchorage.

The problem that affects many anchorage systems is the inability to effectively prevent liquid intrusion into this area of the unsheathed portion. In normal practice, a liquid-tight tubular member is placed onto an end of the tendon so as to cover an unsheathed portion of the tendon. The tubular member slides onto and over the trumpet portion of the encapsulated anchor so as to be frictionally engaged with the trumpet portion of the anchor. The opposite end of the tubular member will include a seal that establishes a generally liquid-tight connection with the sheathed portion of the tendon. Corrosion-protection tube technology suggests placement of an additional tube over the polymeric encapsulation of the tendon. In certain circumstances, these tubes are sometimes improperly installed and are simply additional components that need to be associated with the post-tension system. As such, it adds additional costs and can require additional labor associated with the installation of the tube. Thus, a need has developed so as to avoid the use of corrosion-protection tubes with the dead-end anchor of a post-tension anchor system.

Various patents have been filed by the present inventor addressing the need to avoid the use of corrosion-protection tubes. For example, U.S. patent application Ser. No. 11/861,197, filed on Sep. 25, 2007, discloses a sheathing-retaining article for use with a post-tension anchorage system that has a wedge with a tendon-retaining portion and a sheathing-retaining portion. The tendon-retaining portion has a channel extending longitudinally therealong. The channel is suitable for retaining the tendon therein. The tendon-retaining portion has a tapering outer surface with a wide end at one end of the wedge and a narrow end spaced therefrom. The sheathing-retaining portion extends outwardly from the narrow end of the tendon-retaining portion. The sheathing-retaining portion engages a sheathing of a tendon extending through the channel of the wedge.

The above application added a sheathing lock device to the wedges of a dead-end anchorage system. Wedges that are used in dead-end anchorages have conventionally secured only the unsheathed portion of the tendon within the cavity of the anchor. These wedges have been used so as to impart a frictional engagement, under high pressures, against the outer surface of the unsheathed portion of the tendon. A sheathed portion of the tendon also extends within the cavity of the anchor. It is the sheathing of the sheathed portion within the cavity that tends to shrink without the sheathing lock design of the above application.

It was found, through experimentation, that making a wedge with a sheathing lock on the end thereof posed a challenge of positioning both the wedge and the sheathing lock optimally within the cavity of the anchor. Thus, a need arose for creating a separate sheathing lock to fit within the cavity of the anchor along with the wedges that fix the unsheathed portion of the tendon within the cavity.

In the past, the present inventor has filed various patent applications addressing this problem. For example, U.S. patent application Ser. No. 11/874,087, filed on Oct. 17, 2007, discloses an apparatus for preventing shrinkage of a sheathing of a tendon that has an anchor body having a cavity formed in an interior thereof, a tendon extending into the cavity, a fixing element engaged with the sheathing for fixing a position of the sheathing on the tendon, and a pair of wedges in frictional engagement with the unsheathed portion of tendon in the cavity of the anchor body. The fixing element is positioned away from the cavity of the anchor. An encapsulation is formed over the anchor body so as to define a trumpet extending outwardly from one side of the anchor body. A clamp is engaged with the sheathed portion of the tendon within the trumpet.

U.S. patent application Ser. No. 11/933,041, filed on Oct. 31, 2007, discloses an apparatus for fixing the sheathing of an end of a tendon within an anchor body of a post-tension anchor system that has an anchor body with a cavity formed in an interior thereof, a tendon extending into the cavity that has a sheathing extending at least partially thereover and has a sheathed portion and an unsheathed portion, a pair of wedges in frictional engagement with the unsheathed portion of the tendon in the cavity of the anchor body, and at least one wedge member engaged with the sheathed portion. The wedge member has a first portion and a second portion. The first portion is of a constant thickness and has an end adjacent the pair of wedges. The second portion has a first end and a second end, the second portion being of a decreasing thickness from the first end to the second end.

U.S. patent application Ser. No. 11/933,029, filed on Oct. 31, 2007, discloses a device for fixing the sheathing of an end of a tendon within an anchor body of a post-tension anchor system that has an anchor body having a cavity formed in an interior thereof, a tendon extending into the cavity having a sheathing extending at least partially thereover and having a sheathed portion and an unsheathed portion, a pair of wedges in frictional engagement with the unsheathed portion of the tendon in the cavity of the anchor body, and at least one wedge member engaged with the sheathed portion. The wedge member has a wide end and a narrow end, the wide end being adjacent to the pair of wedges. The wedge member has a decreasing thickness from the wide end to the narrow end.

U.S. patent application Ser. No. 11/950,295, filed on Dec. 4, 2007, discloses an apparatus for fixing the sheathing of an end of a tendon within an anchor body of a post-tension anchor system that has an anchor body having a cavity formed in an interior thereof, a tendon extending into the cavity and having a sheathing extending at least partially thereover and having a sheathed portion and an unsheathed portion, a pair of wedges engaged with the unsheathed portion of the tendon in the cavity of the anchor body, and a wedge member engaged with the sheathing of the sheathed portion. The wedge member is a unitary piece having a longitudinal split extending from an end of the piece to an opposite end of the piece. The wedge member substantially encircles an interior or an exterior of the sheathing of the sheathed portion of the tendon.

Oddly, during experimentation, it was found that prior art wedges as used with the sheathing locks with the above patent applications did not properly engage the wedge members, or sheathing locks, and also had problems aligning the sheathing of the tendon within the cavity for proper engagement with the sheathing locks. Thus, a need has developed for a wedge design that both properly engages sheathing locks within the cavity of the anchor and properly aligns the sheathing of the sheathed portion of a tendon within the cavity of the anchor for proper engagement with the sheathing locks.

It is an object of the present invention to provide a wedge that engages a tendon within the cavity of an anchor.

It is another object of the present invention to provide a wedge that properly aligns the sheathing of the sheathed portion of a tendon within the cavity of an anchor.

It is another object of the present invention to provide a wedge that properly engages a sheathing lock within the cavity of an anchor.

It is still another object of the present invention to provide a wedge that aids in preventing the shrinkage of a sheathed portion of a tendon within that cavity of an anchor.

It is another object of the present invention to provide a wedge that is simple and cost effective.

It is another object of the present invention to provide a wedge that can withstand high pressures of engagement with a tendon inside the cavity of an anchor.

These and other objects and advantages of the present invention will become apparent from a reading of the attached specification and appended claims.

BRIEF SUMMARY OF THE INVENTION

The present invention is a wedge for retaining a tendon in an anchor of a post-tension anchor system comprising a first portion having a channel extending longitudinally therethrough, a second portion having a channel extending longitudinally therethrough, a third portion having a channel extending longitudinally therethrough, and a fourth portion having a channel extending longitudinally therethrough. The first portion has a first end and a second end. The second portion has a first end adjacent to the second end of the first portion. The second portion has a thickness tapering from the first end of the second portion to a second end thereof. The third portion has a first end adjacent to the second end of the second portion. The third portion has a thickness tapering from the first end of the third portion to a second end thereof. The fourth portion has a first end adjacent to the second end of the third portion. The fourth portion has a thickness tapering from the first end of the fourth portion to a second end thereof. The first portion and the second portion and the third portion and the fourth portion have a semi-circular cross-section.

The thickness of the first end of the second portion is equal to the thickness of the second end of the first portion. The thickness of the first end of the third portion is equal to the thickness of the second end of the second portion. The thickness of the first end of the fourth portion is equal to the thickness of the second end of the third portion.

The second portion has an angle of taper of 7° with respect to a longitudinal axis of the wedge. The third portion has an angle of taper of 15° with respect to the longitudinal axis of the wedge. The fourth portion has an angle of taper of 30° with respect to the longitudinal axis of the wedge.

The channel of the first portion has a diameter equal to the channel of the second portion and to the channel of the third portion and to the channel of the fourth portion. The channels of the first portion and the second portion and the third portion and the fourth portion have ribs. The ribs of the channel of the second portion decrease in size from the first end of the second portion to the second end of the second portion. The ribs of the channel of the third portion decrease in size from the first end of the third portion to the second end of the third portion. The ribs of the channel of the fourth portion decrease in size from the first end of the fourth portion to the second end of the fourth portion. The ribs of the third portion are generally smaller than the ribs of the second portion. The ribs of the fourth portion are generally smaller than the ribs of the third portion. The channel of the third portion has an inner wall tapering 4° with respect to the longitudinal axis of the wedge. The channel of the fourth portion has an inner wall tapering 4° with respect to the longitudinal axis of the wedge.

The present invention is also a sheathing lock system comprising a wedge for retaining a tendon in an anchor of a post-tension anchor system, and a wedge member for engaging the sheathing of a sheathed portion of a tendon in an anchor of a post-tension anchor system. The wedge is the wedge as described above.

The wedge member is adjacent the fourth portion of the wedge in the cavity of an anchor. The wedge comprises a tubular body, a collar, a locking thread and a longitudinal split. The tubular body has an inner surface, an outer surface, a first end, and a second end. The collar is positioned on the first end of the tubular body. The collar has an outer diameter equal to a diameter of the outer surface of the tubular body. The collar has an inner diameter less than a diameter of the inner surface of the tubular body. The locking thread extends radially inwardly from the inner surface of the tubular body. The longitudinal spilt extends from the first end to the second end.

DETAILED DESCRIPTION OF THE INVENTION

Figure 1:
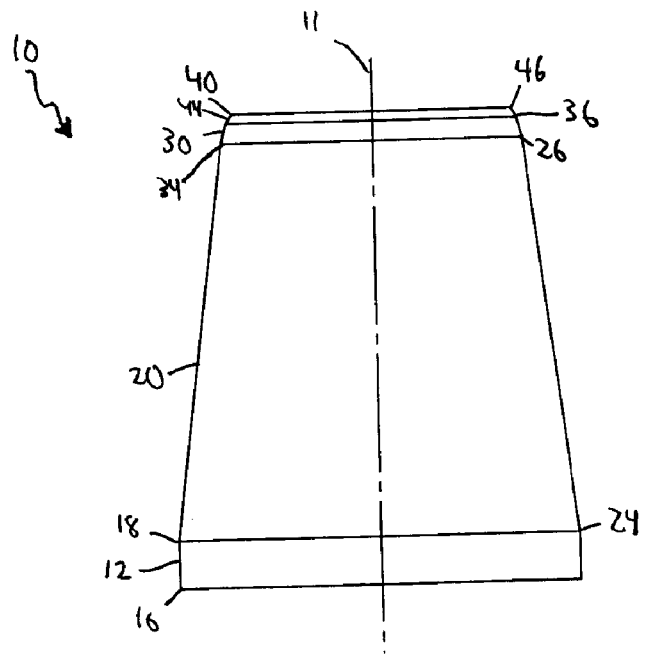
FIG. 1 shows a top view of the wedge of the present invention.

Referring to FIG. 1, there is shown a top view of the wedge 10 of the present invention. The wedge 10 has a first portion 12, a second portion 20, a third portion 30 and a fourth portion 40. All of the portions are symmetric about a longitudinal axis 11 of the wedge 10. The first portion 12 has a first end 16 and a second end 18. The second portion 20 has a first end 24 and a second end 26. The first end 24 of the second portion 20 abuts the second end 18 of the first portion 12. The third portion 30 has a first end 34 and a second end 36. The first end 34 of the third portion 30 abuts the second end 26 of the second portion 20. The fourth portion 40 has a first end 44 and a second end 46. The first end 44 of the fourth portion 40 abuts the second end 36 of the third portion 30.

As can be seen, the wedge 10 has an outer surface that generally tapers from the first portion 12 to the fourth portion 40. This taper, as is described in more detail below, is unique to the present invention in that it allows the wedge 10 to better place a sheathing lock within the cavity of an anchor and better engages the unsheathed portion of a tendon within the cavity of an anchor while better positioning the sheathed portion of the tendon for engagement with the sheathing lock.

Figure 2:
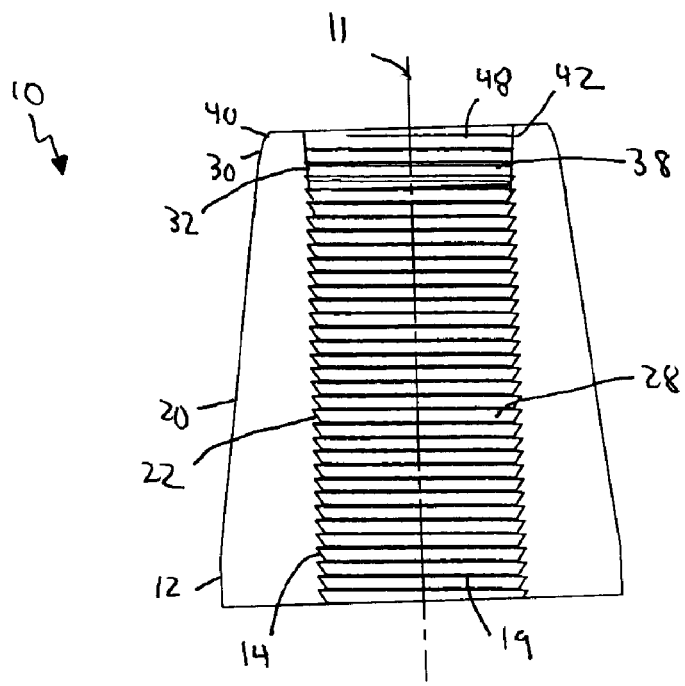
FIG. 2 shows a bottom view of the wedge of the present invention.

Referring to FIG. 2 there is shown a bottom view of the wedge 10 of the present invention. The first portion 12, the second portion 20, the third portion 30 and the fourth portion 40 can all be seen from the bottom view. The first portion 12 has a channel 14 therein. The second portion 20 has a channel 22 therein. The third portion 30 has a channel 32 therein. The fourth portion 40 has a channel 42 therein. Ribs 19 extend radially inwardly from the channel 14 of the first portion 12. Ribs 28 extend radially inwardly from the channel 22 of the second portion 20. Ribs 38 extend radially inwardly from the channel 32 of the third portion 30. Ribs 48 extend radially inwardly from the channel 42 of the fourth portion 40. As can be seen, the ribs 28, 38, 48, and 19 have sharp edges so as to engage the surface of a tendon. The ribs better enable the wedge 10 to engage a tendon within a cavity of an anchor.

Noticeable is that the outer surface of the portions tapers inwardly from the first portion 12 to the fourth portion 40. Also noticeable is that the inner wall of the portions 12, 20, 30 and 40 that form the channels 14, 22, 32, and 42 do not taper like the outer walls. As is described in more detail below, the inner walls 33 and 43 of the third portion 30 and the fourth portion 40, respectively, do taper at a slight angle with respect to the longitudinal axis 11.

Figure 3:
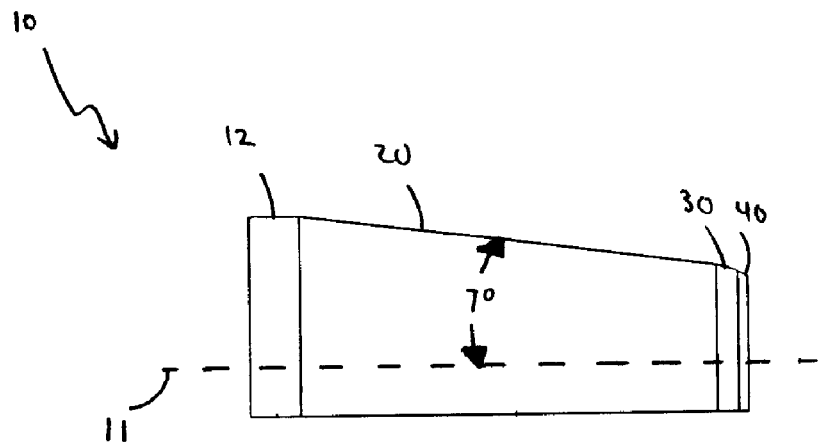
FIG. 3 shows a side view of the wedge of the present invention.

Referring to FIG. 3, there is shown a side view of the wedge 10 of the present invention. It can be seen how the portions 12, 20, 30 and 40 taper inwardly from the first portion 12 to the fourth portion 40. In particular, it can be seen that the angle of taper of the second portion 20 is 7° with respect to the longitudinal axis 11 of the wedge 10.

Figure 4:
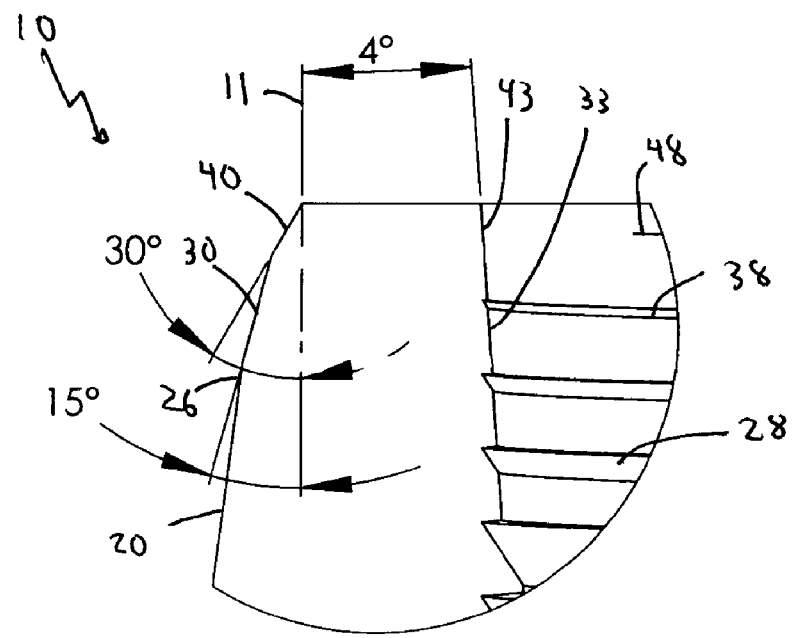
FIG. 4 shows a close-up bottom view of the second, third, and fourth portions of the present invention.

Referring to FIG. 4, there is shown a close-up view of the bottom corner of the wedge 10. This view shows the second portion 20, the third portion 30, and the fourth portion 40. As discussed in FIG. 3, the angle of taper of the second portion 20 is 7°. As can be appreciated in FIG. 4, the angle of taper of the third portion 30 is 15°. The angle of taper of the fourth portion 40 is 30°. The angles of taper are all measured with respect to the longitudinal axis 11 of the wedge 10. The inner wall 33 of the third portion 30 and the inner wall 43 of the fourth portion 40 also have an angle of taper with respect to the longitudinal axis 11 of the wedge 10. As can be seen, the inner wall 33 of the third portion 30 has an angle of taper of 4° with respect to the longitudinal axis 11. The inner wall 43 of the fourth portion 40 has an angle of taper of 4° with respect to longitudinal axis 11 of the wedge 10.

FIG. 4 also shows a taper in the size of the ribs 28, 38 and 48 of the second portion 20, the third portion 30, and the fourth portion 40, respectively. The ribs 28 of the second portion 20 begin to decrease in size near the second end 26 of the second portion 20. The ribs 38 of the third portion 30 are smaller than the ribs 28 of the second portion 20. The ribs 48 of the fourth portion 40 are smaller than the ribs 38 of the third portion 30.

Figure 5:
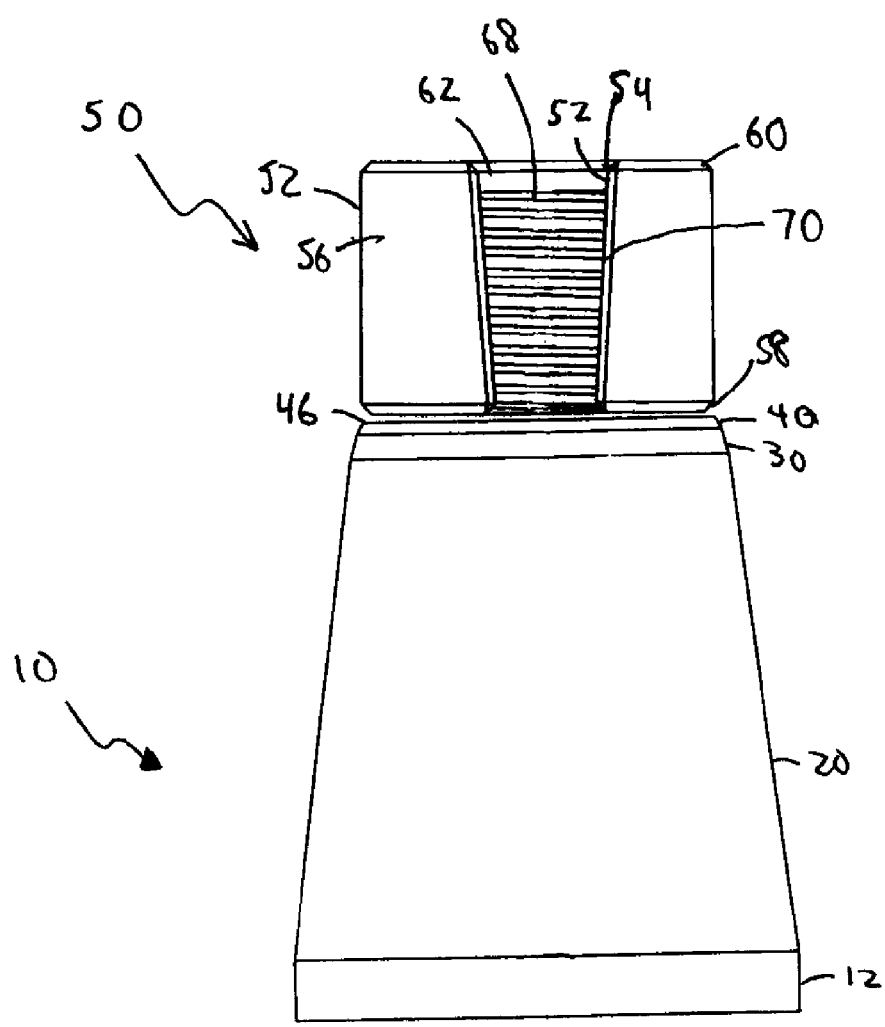
FIG. 5 shows a top view of the wedge in combination with the sheathing lock of the present invention.

Referring to FIG. 5, there is shown the wedge 10 of the present invention in combination with a sheathing lock 50. The sheathing lock 50 fits against the second end 46 of the fourth portion 40. The sheathing lock 50 has a tubular body 52 that has an inner surface 54 and an outer surface 56. The tubular body 52 also has a first end 58 and a second end 60. The first end 58 abuts the second end 46 of the fourth portion 40 of the wedge 10. The sheathing lock 50 also has a collar 62 on the second end 60 thereof. As shown in the top view of FIG. 5, the locking thread 68 can be seen through the longitudinal split 70 in the sheathing lock 50.

In operation, a tendon is inserted into the sheathing lock, and the sheathing lock is compressed in the cavity of an anchor. When this happens, the longitudinal split closes so as to force the locking thread to grip the sheathing of a tendon inserted therein. Thus, the size of the sheathing lock 50 is smaller in diameter than that shown in FIG. 5 once the sheathing lock 50 has been compressed in the cavity of an anchor.

Noticeable in FIG. 5 is the taper of the fourth portion 40 and the third portion 30 of the wedge 10. The taper of the wedge 10 helps ensure proper engagement with the first end of the sheathing lock 50. The taper of the wedge 10 also helps keep the sheathing of the tendon that is inserted in the wedge 10 and sheathing lock 50 from being trapped between the wedge 10 and another wedge piece.

Figure 6:
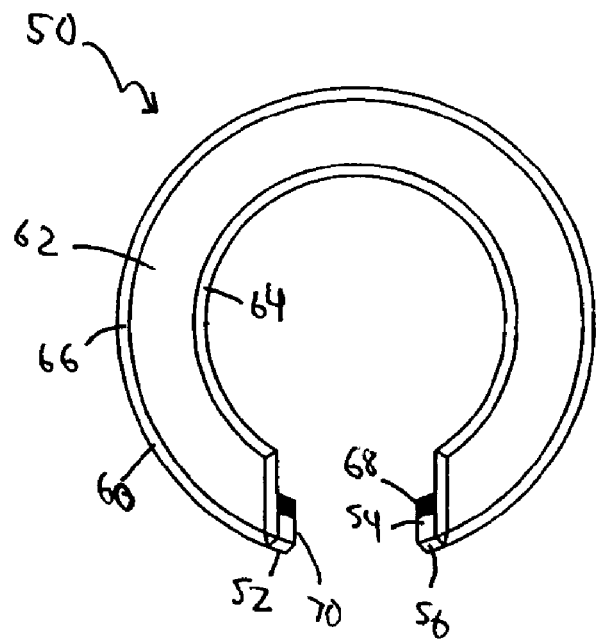
FIG. 6 shows an end view of the sheathing lock of the present invention.

Referring to FIG. 6, there is shown an end view of the sheathing lock 50. The second end 60 of the sheathing lock 50 is shown with the collar 62 mounted thereto. It can be seen that the inner surface 54 of the tubular body 52 has a larger diameter than the inside 64 of the collar 62. The outer surface 56 of the tubular body 52 has a diameter equal to the diameter of the outside 66 of the collar 62. The longitudinal split 70 of the tubular body 52 can also be seen. The locking thread 68 extends radially inwardly from the inner surface 54 of the tubular body 52. The sheathing lock 50 is substantially circular in shape.

Figure 7:
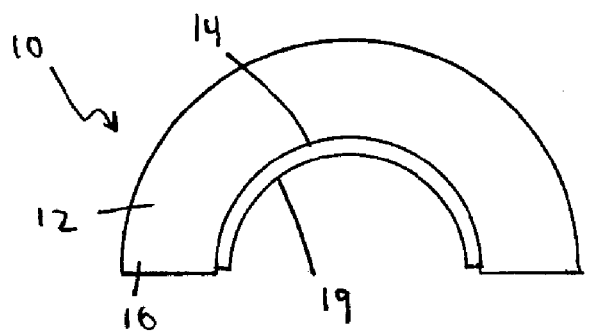
FIG. 7 shows an end view of the wedge of the present invention.

Referring to FIG. 7, there is shown an end view of wedge 10 of the present invention. As can be seen, the wedge 10 is semi-circular in shape. The wedge 10 is shown viewing the first end 16 of the first portion 12. The ribs 19 of the first portion 12 extend radially inwardly from the channel 14 of the first portion 12. In practice, two of these semi-circular wedges 10 are inserted in the cavity of an anchor so as to affix an unsheathed portion of a tendon that is inserted between the two wedges in the cavity of an anchor.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A wedge for retaining a tendon in an anchor of a post-tension anchor system comprising:

a first portion having a channel extending longitudinally therethrough, said first portion having a constant thickness from a first end to a second end;

a second portion having a channel extending longitudinally therethrough, said second portion having a first end adjacent to said second end of said first portion, said second portion having a thickness tapering from said first end of said second portion to a second end thereof;

a third portion having a channel extending longitudinally therethrough, said third portion having a first end adjacent to said second end of said second portion, said third portion having a thickness tapering from said first end of said third portion to a second end thereof; and a fourth portion having a channel extending longitudinally therethrough, said fourth portion having a first end adjacent to said second end of said third portion, said fourth portion having a thickness tapering from said first end of said fourth portion to a second end thereof, said channel of said first portion having a diameter equal to said channel of said second portion and to said channel of said third portion and to said channel of said fourth portion, said channels of said first portion and said second portion and said third portion and said fourth portion having ribs, said ribs of said channel of said second portion decreasing in size from said first end of said second portion to said second end of said second portion.

2. The wedge of claim 1, said first portion and said second portion and said third portion and said fourth portion having a semi-circular cross-section.

3. The wedge of claim 2, said thickness of said first end of said second portion being equal to said thickness of said second end of said first portion.

4. The wedge of claim 3, said thickness of said first end of said third portion being equal to said thickness of said second end of said second portion.

5. The wedge of claim 4, said thickness of said first end of said fourth portion being equal to said thickness of said second end of said third portion.

6. The wedge of claim 1, said second portion having an angle of taper of 7 degrees with respect to a longitudinal axis of the wedge.

7. The wedge of claim 6, said third portion having an angle of taper of 15 degrees with respect to said longitudinal axis of the wedge.

8. The wedge of claim 7, said fourth portion having an angle of taper of 30 degrees with respect to said longitudinal axis of the wedge.

9. The wedge of claim 1, said ribs of said channel of said third portion decreasing in size from said first end of said third portion to said second end of said third portion, said ribs of said third portion being generally smaller than said ribs of said second portion.

10. The wedge of claim 9, said ribs of said channel of said fourth portion decreasing in size from said first end of said fourth portion to said second end of said fourth portion, said ribs of said fourth portion being generally smaller than said ribs of said third portion.

11. The wedge of claim 1, said channel of said third portion having an inner wall tapering 4 degrees with respect to a longitudinal axis of the wedge, said channel of said fourth portion having an inner wall tapering 4 degrees with respect to said longitudinal axis of the wedge.

12. A wedge for retaining a tendon in an anchor of a post-tension anchor system comprising:

a first portion having a channel extending longitudinally therethrough, said first portion having a constant thickness from a first end to a second end;

a second portion having a channel extending longitudinally therethrough, said second portion having a first end adjacent to said second end of said first portion, said second portion having a thickness tapering from said first end of said second portion to a second end thereof;

a third portion having a channel extending longitudinally therethrough, said third portion having a first end adjacent to said second end of said second portion, said third portion having a thickness tapering from said first end of said third portion to a second end thereof;

a fourth portion having a channel extending longitudinally therethrough, said third portion having a first end adjacent to said second end of said third portion, said fourth portion having a thickness tapering from said first end of said fourth portion to a second end thereof, said first portion and said second portion and said third portion and said fourth portion having a semi-circular cross-section; and ribs extending radially inwardly from said channels of said first portion and said second portion and said third portion and said fourth portion, said ribs of said second portion decreasing in size from said first end to said second end thereof, said ribs of said third portion decreasing in size from said first end to said second end thereof, said ribs of said fourth portion decreasing in size from said first end to said second end thereof.

13. The wedge of claim 12, said ribs of said third portion being generally smaller than said ribs of said second portion, said ribs of said fourth portion being generally smaller than said ribs of said third portion.

14. The wedge of claim 12, said thickness of said first end of said second portion being equal to said thickness of said second end of said first portion, said thickness of said first end of said third portion being equal to said thickness of said second end of said second portion, said thickness of said first end of said fourth portion being equal to said thickness of said second end of said third portion.

15. The wedge of claim 12, said second portion having an angle of taper of 7 degrees with respect to a longitudinal axis of the wedge, said third portion having an angle of taper of 15 degrees with respect to said longitudinal axis of the wedge, said fourth portion having an angle of taper of 30 degrees with respect to said longitudinal axis of the wedge.

16. The wedge of claim 12, said channel of said third portion having an inner wall tapering 4 degrees with respect to a longitudinal axis of the wedge, said channel of said fourth portion having an inner wall tapering 4 degrees with respect to said longitudinal axis of the wedge.

* * * * *